(12) United States Patent
Blauensteiner et al.

(10) Patent No.: US 6,455,949 B1
(45) Date of Patent: Sep. 24, 2002

(54) VEHICLE ELECTRICAL SYSTEM IN MOTOR VEHICLES

(75) Inventors: Wolf-Dieter Blauensteiner, Neuhausen; Fritz Schmidt, Waiblingen, both of (DE)

(73) Assignee: DaimlerChrysler, Stuttgart (DE)

( * ) Notice: Subject to any disclaimer, the term of this patent is extended or adjusted under 35 U.S.C. 154(b) by 0 days.

(21) Appl. No.: 09/567,107

(22) Filed: May 8, 2000

(30) Foreign Application Priority Data

May 8, 1999 (DE) ......................................... 199 21 451

(51) Int. Cl.$^7$ ................................................. H02G 3/00
(52) U.S. Cl. ....................... 307/10.1; 307/9.1; 307/10.6; 307/10.7; 307/10.8; 307/66
(58) Field of Search ............................... 307/43, 46, 64, 307/65, 66, 80, 82, 112, 115, 125, 10.7, 10.1, 9.1, 10.8, 10.6, 25, 26, 27, 28, 29; 320/132

(56) References Cited

U.S. PATENT DOCUMENTS 5,549,984 A * 8/1996 Dougherty ................... 429/61
5,814,972 A * 9/1998 Shimada et al. ............. 320/132
6,104,103 A * 8/2000 Siewert et al. ................. 307/64

FOREIGN PATENT DOCUMENTS

DE         185 51 612 A1    6/1998

OTHER PUBLICATIONS

VDI Berichte 1415: Verein Deutscher Ingenieure; VDI–Gesellschaft Fahrzeug–Und Verkehrstechnik; Elektronik IM Kraftahrzeug; Electronic Systems for Vehicles; Tagung Baden–Baden, 8. Und 9. Oct. 1998.

* cited by examiner

Primary Examiner—Brian Sircus
Assistant Examiner—Robert L. Deberadinis
(74) Attorney, Agent, or Firm—Crowell & Moring LLP

(57) ABSTRACT

A multivoltage vehicle electrical system for supplying electrically operated loads in motor vehicles, specific loads being respectively assigned to each vehicle electrical circuit which is respectively operated with a different voltage, is characterized in that cross-connecting means are provided which, in the event of a failure or fault in a circuit, automatically ensure that the loads connected to this failed vehicle electrical circuit are supplied from one of the other vehicle electrical circuits.

4 Claims, 1 Drawing Sheet

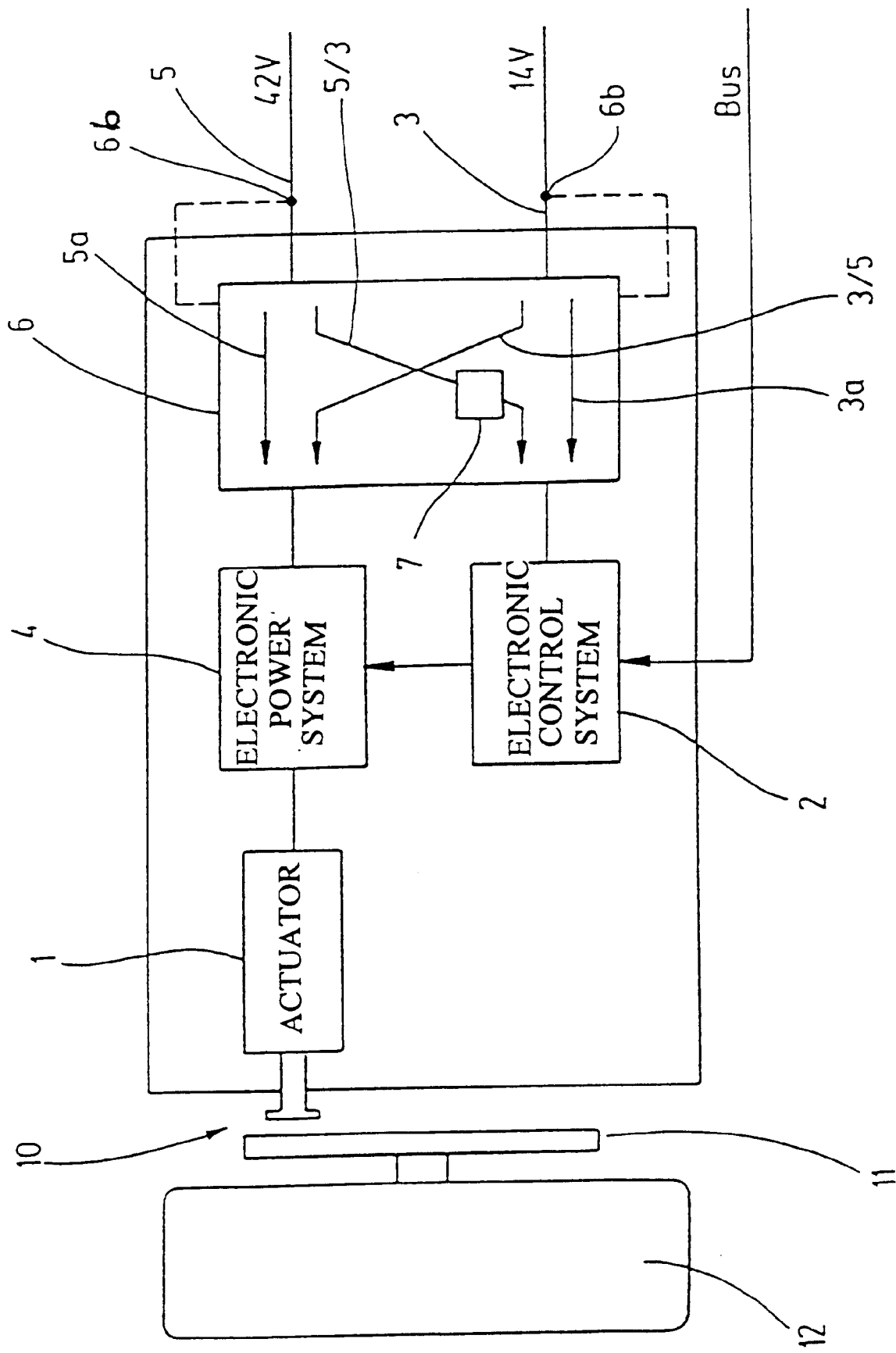

VEHICLE ELECTRICAL SYSTEM IN MOTOR VEHICLES

BACKGROUND OF THE INVENTION

The invention relates to a vehicle electrical system for supplying electrically operated loads in motor vehicles.

A known vehicle electrical system of this type (DE 196 51 612 A1) comprises a common voltage supply terminal for the entire vehicle electrical system to which, preferably, a vehicle electrical system control unit is connected, said control unit then itself supplying the loads which are connected to it. The vehicle electrical system control unit can comprise additional voltage converters which convert the general power supply voltage fed to it into various voltages depending on the requirements of the loads which are to be respectively supplied. In order to ensure that the various electronic and electrical components are safely and reliably supplied with a voltage, a plurality of voltage supply sources, which may possibly also have different voltages, are provided, one of which is connected in each case to the voltage supply terminal for the vehicle electrical system control unit.

For this purpose, sensors are provided in the form of Zener diodes and other associated transistors which detect the failure of a power supply source when a switch, usually an ignition switch, closes and switch over the common voltage supply terminal to another voltage supply source.

The practice of embodying vehicle electrical systems with two or more circuits which usually have different supply voltages is generally known and efforts are being made to promote it, in particular in view of the continuously rising demand for electrical power in motor vehicles. In this respect, reference is made, in particular, to the paper "Entwicklung künftiger Bordnetz-Architekturen . . . [Development of future architectures for vehicle electrical systems]" in VDI reports, No. 14/15, 1998 (conference in Baden-Baden, Oct. 8 & 9 1998). For example, there have been extensive investigations into a dual-voltage vehicle electrical system (see FIG. 1 of the aforesaid paper) in which a first vehicle electrical system is provided with a relatively high supply voltage, for example 42 volts for high-consumption loads, continuous loads, heaters and for regulated loads (fans, seat motors), while a second, and in this context customary, 14 V vehicle electrical system is used to supply lower-power loads, in particular quiescent current and low-voltage loads such as filament lamps, electronic control systems, communications and the like.

Both vehicle electrical circuits can be supplied here with current by a common generator which operates directly on the high-consumption load and the starter area and which is assigned its own battery, in the specific case of a 42 V vehicle electrical system, a 36 V battery, while the 14 V loads are connected to the generator by means of a direct voltage converter, specifically a so-called DC-DC converter, and preferably have their own 12 V buffer battery.

Since devices which have previously been operated mechanically, hydraulically or even pneumatically in vehicles are increasingly being embodied as electrical devices, the demand for electrical power is determined by the actuation of these devices or by the provision of operating power (servo support), respectively, or else by both of these at the same time.

If the respective devices which are now operated electrically are systems which relate to safety, for example electromechanical brakes, electromechanical steering systems or generally so-called X-by-wire systems, for legal reasons alone it is necessary to provide redundancy, or an emergency operating mode, owing to general safety considerations.

SUMMARY OF THE INVENTION

The invention is therefore based on the object of ensuring in a multivoltage vehicle electrical system in motor vehicles that at least one emergency operating mode is provided in a vehicle electrical circuit, which is possibly at risk of failure, for the loads which are fed by said vehicle electrical circuit.

The invention achieves this object in the multivoltage vehicle electrical system mentioned at the beginning by means of a cross-connection which responds in the event of a failure of the vehicle electrical circuit and feeds electrical power from the respective other vehicle electrical system even to the loads which are assigned to the failed vehicle electrical system, at least to such an extent that a possibly reduced emergency operating mode is possible.

In this context, in the event of a failure of the vehicle electrical circuit which has a relatively low voltage, the problems incurred are not wider ranging because an uncomplicated reduction in the voltage from the vehicle electrical system which has a relatively high voltage can continue to ensure the supply voltage necessary for the electronic control system, for example by using customary DC-DC converters or in-phase regulators. In any case, the loads on the lower voltage level are predominantly lower-power ones which can also be supplied from the other vehicle electrical circuit for the period until the damage is remedied.

However, in the event of a failure of the vehicle electrical circuit with a relatively high voltage, in which circuit there are continuous loads, the electronic power system, servo systems which have a high power demand and actuator motors, the preferably direct cutting in of the lower-voltage vehicle electrical circuit which ensures the emergency operating mode is advantageous because immediate failure of the system is avoided and the only disadvantage is a relatively slow response, possibly also with reduced effect.

In any case, the failure of a respective electrical supply circuit in the motor vehicle is, of course, signalled to the operator by means of suitable indication, for example by means of a flashing indicator lamp or signalling tone, in order to find as soon as possible a repair possibility with a correspondingly reduced speed.

If appropriate, in this case it is also possible to use engine speed limiters which permit the motor vehicle to continue to operate only to a limited degree.

The basic idea of the invention consists in the fact that in the case of a multivoltage vehicle electrical system the respectively intact power supply of a vehicle electrical circuit is to be switched over, by a cross-connection which responds when necessary, to a defective vehicle electrical circuit, with the result that an emergency operating mode and a respectively increased level of operational reliability are obtained.

BRIEF DESCRIPTION OF THE DRAWING

The single FIGURE of the drawing shows a possible exemplary embodiment of the invention in schematic form as a block circuit diagram.

DETAILED DESCRIPTION

The drawing illustrates a dual-voltage vehicle electrical system having a first vehicle electrical circuit 5 with a supply voltage for the loads of 42 volts which are connected to this circuit, and a second vehicle electrical circuit 3 with a supply voltage of 14 volts. Of course, these numerical data are given only for the sake of better comprehension, but do not restrict the invention, which also includes the possibility of other vehicle electrical circuits with different voltages.

The exemplary embodiment illustrated relates to an electromechanical disc brake 10 whose brake disc 11 is mountedly on the axle of the assigned vehicle wheel 12. A servomotor 1 which is embodied as an actuator acts on the brake callipers and thus actuates the electromechanical disc brake. The servomotor is actuated by an upstream electronic power system 4 which draws its power supply from the vehicle electrical circuit 5 which is provided with the high voltage of 42 volts.

The control commands for the electronic power system are generated by an assigned electronic control system 2, which is provided with appropriate command signals over a BUS line and is connected to the 14 V vehicle electrical circuit 3 for its power supply.

Of course, this representation which is given in the drawing and which relates specifically to an electromechanical disc brake also relates to all other, that is to say any loads of a dual-voltage or multivoltage vehicle electrical system in motor vehicles, and stands for them by way of representation.

In accordance with a feature of the present invention, a cross-connecting arrangement 6 is connected between the vehicle electrical circuits 3 and 5 and the associated loads, here electronic power system 4 and electronic control system 2, said cross-connecting arrangement 6 permitting various circuit connections between the vehicle electrical circuits and basically operating in such a way that in a normal situation the line connecting paths are connected through between the respective vehicle electrical circuits and the loads which are directly connected to them, i.e. there is a direct electrical line connection 5a between the 42 V vehicle electrical circuit to the associated electronic power system 4 and, of course, to all the other (power) loads connected to this vehicle electrical circuit, and there is a direct electrical line connection 3a between the 14 V vehicle electrical system and the associated load 2, related to an electronic control system, and, of course, to all the other loads connected to this vehicle electrical system. Here, in a multivoltage vehicle electrical system there is, of course, either only one cross-connecting arrangement 6, given appropriate power configuration of its switch-over systems or, if it is desired or appropriate, there may also be a number of these cross-connecting arrangements 6 so that, for example, they can be arranged directly spatially adjoining the respective loads.

The cross-connecting arrangement 6 has appropriate sensors 6a, 6b which sense the failure or the defect in one or more vehicle electrical systems and automatically initiate appropriate cross-connections to the respective vehicle electrical circuit which is still active, so that the possibility of an emergency operating mode for supplying power to failed vehicle electrical circuits is provided.

In the specific case of the cutting in of the highly incompatible 42 V power supply to the low-voltage electronic control circuit of 14 volts, a voltage-reducing arrangement 7 is provided in the crossover connection 5/3 from the 42 V vehicle electrical circuit to the 14 V vehicle electrical circuit, said crossover connection 5/3 ensuring that appropriately reduced voltage values are made available from the 42 V vehicle electrical system for the loads of the low-voltage vehicle electrical circuit of 14 volts, as far as possible without power loss. DC-DC converters or in-phase regulators in a suitable configuration can be used for this.

The other crossover connection from the 14 V vehicle electrical circuit to the 42 V vehicle electrical circuit is designated by 3/5 and it supplies the loads of the 42 V circuit directly with the 14 V voltage of the vehicle electrical circuit 3. This is sufficient to ensure an emergency power supply to the connected systems.

For the switching-over operations in the cross-connecting arrangement 6, that is to say switching over from the line connection 5a to the line connection 3/5 or from 3a to the line connection 5/3 with the intermediately connected voltage-reducing arrangement 7, any desired switching arrangement can be used, for example purely electronic switches in the form of MOS-FETs with appropriately configured power, other power semiconductors or even relay switching devices, which in this case where they are expected to be employed very infrequently, can be used perfectly well.

For example, by using quiescent current relays, which normally maintain the line connections 5a and 3a, it is possible to dispense with the sensors 6a, 6b because, in the event of the failure of the power supply, these relays can then be configured in such a way that they switch over automatically to the respective crossover connection. Of course, the power supply for the cross-connecting arrangement 6 is, in any case, based on both, or on all the vehicle electrical circuits which are present so that their operational capability is in any case protected as long as one of the vehicle electrical systems is still operational, permitting failed vehicle electrical systems to be switched over to it.

It has already been mentioned at the beginning that for the possibility of the failure of the higher voltage vehicle electrical circuit, a loss in response speed and/or effect usually has to be accepted for the (power) loads connected to this circuit. In the configuration of such servomotor systems and other "drive-by-wire systems", the latter still, however, exhibit an operationally capable response and operational characteristic, and even at a comparatively low supply voltage they still have a sufficient power drain. Alternatively, it is possible, and lies within the scope of the invention, still to provide switching means to increase the voltage in the crossover line connection 3/5, which is appropriate in particular if high-power loads, such as electromechanical brakes or an electromechanical steering system which have a particular relevance for safety and whose power consumption remains and can be predicted within predefined limits, are provided with their own cross-connecting arrangements. In contrast to this, loads which have less relevance to safety, such as heaters, fan motors and the like and which are also connected to the 42 V vehicle electrical system can then easily be supplied with the lower voltage via a common cross-connecting arrangement until the fault is eliminated.

What is claimed is:

1. A vehicle electrical system for supplying electrically operated loads in a motor vehicle, said system comprising:

at least a first power supply source having a first voltage and a second power supply source having a second voltage different from said first voltage;

sensor means for sensing a failure of one of said first and second power supply sources;

switching means responsive to an output of said sensor means for switching from one of said first and second power supply source to another one of said first and second power supply source;

at least a first vehicle electrical circuit and a second vehicle electrical circuit wherein each of said first and second vehicle electrical circuits are operated with different voltages and are each connected to different ones of said electrically operated loads wherein each of said vehicle electrical circuits is connected continuously to a respective associated one of said first and second power supply sources;

cross-connecting means connected between said first and said second vehicle electrical circuits which, in the event of a failure or fault in one of said first and said second vehicle electrical circuits, automatically ensures that the plurality of loads connected to said failed vehicle electrical circuit are supplied from the other vehicle electrical circuit which is intact by means of a current connection switching device.

2. The vehicle electrical system according to claim 1, wherein the cross-connecting means are part of a cross-connecting arrangement, which is connected between the respective first and second vehicle electrical circuits and the loads assigned to these circuits, and said system further includes line switch means for the crossover connection of the vehicle electrical circuits to the loads of the vehicle electrical system.

3. The vehicle electrical system according to claim 1, wherein in order to connect loads, normally connected to said first vehicle electrical circuit having a relatively low voltage, to said second vehicle electrical circuit having a relatively high voltage, a voltage-reducing arrangement is arranged in a crossover connecting line between the first and second electrical circuit.

4. The vehicle electrical system according to claim 1, wherein ones of said electrical loads which relate to safety, including at least one of electromechanical disc brakes, electromechanical steering system, and X-by-wire systems are assigned respective further cross-connecting arrangements, which also have a step-up transformer arrangement for supply voltages.

* * * * *